United States Patent
Mori (10) Patent No.: US 10,416,825 B2
(45) Date of Patent: Sep. 17, 2019

(54) TOUCH PANEL DEVICE AND IMAGE DISPLAY DEVICE INCLUDING THE TOUCH PANEL DEVICE

(71) Applicant: Mitsubishi Electric Corporation, Tokyo (JP)

(72) Inventor: Seiichiro Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/876,831

(22) Filed: Jan. 22, 2018

(65) Prior Publication Data

US 2018/0224962 A1 Aug. 9, 2018

(30) Foreign Application Priority Data

Feb. 8, 2017 (JP) .................................. 2017-021182

(51) Int. Cl.
*G06F 3/041* (2006.01)
*G09G 3/36* (2006.01)
*G06F 3/044* (2006.01)

(52) U.S. Cl.
CPC ............ *G06F 3/044* (2013.01); *G06F 3/0412* (2013.01); *G06F 3/0416* (2013.01); *G06F 3/0418* (2013.01); *G06F 2203/04107* (2013.01)

(58) Field of Classification Search
CPC .... G06F 3/0412; G06F 3/0416; G06F 3/0418; G06F 3/044; G06F 2203/04107
See application file for complete search history.

(56) References Cited

U.S. PATENT DOCUMENTS

| | | | | |
|---|---|---|---|---|
| 7,105,998 | B2* | 9/2006 | Fukuda | H05B 33/04 |
| | | | | 313/500 |
| 2002/0180712 | A1* | 12/2002 | Sato | G06F 3/041 |
| | | | | 345/173 |
| 2014/0036458 | A1 | 2/2014 | Sato et al. | |
| 2015/0370376 | A1 | 12/2015 | Harley et al. | |
| 2016/0349907 | A1 | 12/2016 | Kobayashi et al. | |

FOREIGN PATENT DOCUMENTS

| | | |
|---|---|---|
| JP | 2011-150550 A | 8/2011 |
| JP | 2013-222283 A | 10/2013 |
| JP | 2014-029372 A | 2/2014 |
| JP | 2016-507119 A | 3/2016 |
| JP | 2016-224728 A | 12/2016 |
| WO | 2014/124173 A1 | 8/2014 |

* cited by examiner

*Primary Examiner* — Nelson M Rosario
(74) *Attorney, Agent, or Firm* — Studebaker & Brackett PC (57) ABSTRACT

A touch sensor panel includes a plurality of sensors. A protective plate protects the touch sensor panel. A transparent adhesive material attaches the touch sensor panel and the protective plate. A moisture-proof sealing member has water vapor permeability that is lower than water vapor permeability of the transparent adhesive material. A flexible wiring board connects the plurality of sensors to an external circuit. The transparent adhesive material has a region that is out of contact with the protective plate or the touch sensor panel, and at least a part of the region is covered by the moisture-proof sealing member.

5 Claims, 6 Drawing Sheets

TOUCH PANEL DEVICE AND IMAGE DISPLAY DEVICE INCLUDING THE TOUCH PANEL DEVICE

BACKGROUND OF THE INVENTION

Field of the Invention

The present invention relates to an electrostatic capacitive touch panel device, and an image display device including the electrostatic capacitive touch panel device.

Description of the Background Art

A touch panel device that detects a touch of a pointer such as a finger and determines coordinates indicating a position of the touch (touch coordinates) is widely used in various information processing devices. Particularly, a touch panel device in which a touch panel is mounted on a screen of a display device is widespread as a new user interface of information processing devices.

In a projection-type electrostatic capacitive system being one of electrostatic capacitive systems, a detection circuit detects slight change in touch sensors provided in a touch panel, which is caused by electrostatic capacitance of a human finger. Then, based on such detection results, positional coordinates in the touch panel are calculated. According to this method, a touch can be detected even in a case where a front surface side of the touch panel with built-in touch sensors is covered by a protective plate such as a glass substrate having a thickness of approximately several millimeters.

A projected capacitive touch screen device has advantages such as excellent robustness owing to capability of arranging the protective plate in a front surface, capability of detecting a touch even when gloves are worn, and a long life owing to absence of movable parts. The protective plate of the projected capacitive touch screen device is formed of a transparent resin substrate such as acryl and polycarbonate, a glass substrate, or the like. In a case where such a structure is used that an outer profile size of a touch surface to which positional information is input with a pointer such as a finger is made larger than a sensor surface for detecting electrostatic capacitance so as to have the sensor surface overhung and covered by the touch surface, a product excellent in design can be provided (refer to Japanese Patent Application Laid-Open No. 2016-224728).

In such a touch panel device, a surface to be operated by a pointer such as a finger is made of glass or the like, thereby securing durability, and is therefore often used under a condition where a high dielectric substance, such as rain, sea water, beverage, and chemicals, adheres thereto. Robustness is required as an ability of the projected capacitive touch screen device, and stable operation without misdetection even at the time of moisture adhesion is required in addition to capability of highly sensitive detection even when gloves are worn and the like.

For example, Japanese Patent Application Laid-Open No. 2013-222283 discloses a touch panel device that suppresses misdetection even in a case of adhesion of a water droplet or the like.

In a structure of a projected capacitive touch screen device, a touch panel substrate with built-in touch sensors and a protective plate are often attached with a transparent adhesive material (optical clear adhesive (also generally abbreviated as OCA)). As the transparent adhesive material, a material having relative permittivity of approximately from 3 to 6 and water vapor permeability of approximately from 50 g/m$^2$·24 hr to 300 g/m$^2$·24 hr, such as an acrylic resin, is generally used.

Relative permittivity of the transparent adhesive material is changed depending on a temperature, and may be reduced by up to 40% with respect to a room temperature state under an environment of a low temperature (−30° C.) or a high temperature (70° C.). Further, relative permittivity of the transparent adhesive material may be changed through moisture absorption. Such change in relative permittivity is a cause of changing electrostatic capacitance measured by touch sensors.

Further, moisture to be absorbed by the transparent adhesive material enters through a portion exposed to outside air, which is not covered by a protective glass (protective plate) or a touch sensor panel. Therefore, influence thereof is demonstrated as change from a peripheral portion of the transparent adhesive material, which leads to distribution of relative permittivity in a surface of the transparent adhesive material. Thus, the change in relative permittivity of the transparent adhesive material not only influences self-capacitance and mutual capacitance of a touch region of a touch panel, but also tends to influence a peripheral portion of a surface of the touch panel. Thus, lead-out wiring of the touch sensor panel that is wired along a periphery of the touch sensor panel is also subjected to such influence.

Particularly, in a highly sensitive touch panel device that is adaptable to use of gloves and the like, electrostatic capacitance formed by a pointer is extremely small, and hence, relatively, influence due to change in relative permittivity of the transparent adhesive material becomes larger. A touch panel device disclosed in Japanese Patent Application Laid-Open No. 2016-224728 suppresses change in electrostatic capacitance coupling between touch sensors and a conductor such as a metallic frame of a display device at the time when a substance having extremely high relative permittivity (relative permittivity of approximately 80), such as water, adheres to a protective glass, to thereby suppress misdetection of a touch panel.

However, as means of suppressing change in electrostatic capacitance coupling, a protective glass having a black frame printing that is formed of conductive electrodes and a circuit for driving the conductive electrodes are required, which leaves a problem in increase in cost for components. Further, influence of moisture absorption of the transparent adhesive material is not particularly taken into consideration.

SUMMARY

The present invention has been made in order to solve the problems as described above, and has an object to provide a touch panel device having high sensitivity that is adaptable to a glove operation and the like even when a protective plate is provided and suitable for use under a high temperature and high humidity condition, and an image display device including the touch panel device. Further, an object is to provide a touch panel device that has robustness through adoption of a thick protective plate, adoption of a metallic frame in an image display module, or the like, and suppresses misdetection even in a case where a water droplet or the like adheres thereto, and an image display device including the touch panel device.

A touch panel device according to the present invention includes a touch sensor panel having a plurality of sensors, a protective plate for protecting the touch sensor panel, a transparent adhesive material for attaching the touch sensor panel and the protective plate, a moisture-proof sealing member having water vapor permeability that is lower than water vapor permeability of the transparent adhesive material, and a flexible wiring board for connecting the plurality of sensors to an external circuit. The transparent adhesive material has a region that is out of contact with the protective plate or the touch sensor panel, and at least a part of the region is covered by the moisture-proof sealing member.

According to the present invention, the transparent adhesive material has a region that is out of close contact from the protective plate and the touch sensor panel, and at least a part of the region is covered by the moisture-proof sealing member. With this, it is possible to suppress misdetection at the time of a touch coordinate detection operation of the electrostatic capacitive touch panel device under a high humidity environment.

These and other objects, features, aspects and advantages of the present invention will become more apparent from the following detailed description of the present invention when taken in conjunction with the accompanying drawings.

DESCRIPTION OF THE PREFERRED EMBODIMENTS

Description is given below of preferred embodiments of the present invention with reference to the drawings. The following description illustrates preferred embodiments of the present invention, and the scope of the present invention is not to be limited to the following preferred embodiments. In the following description, components denoted by like reference symbols substantially exhibit similar contents.

(First Preferred Embodiment)

Figure 1:
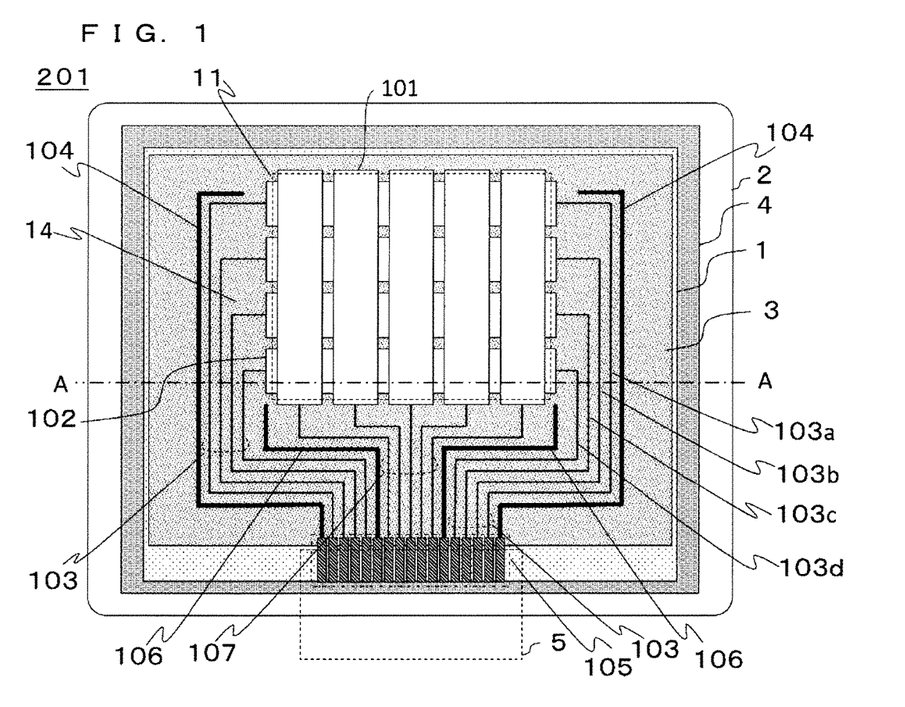
FIG. 1 is a top view schematically illustrating a structure of a touch panel device according to a first preferred embodiment.
Figure 2:
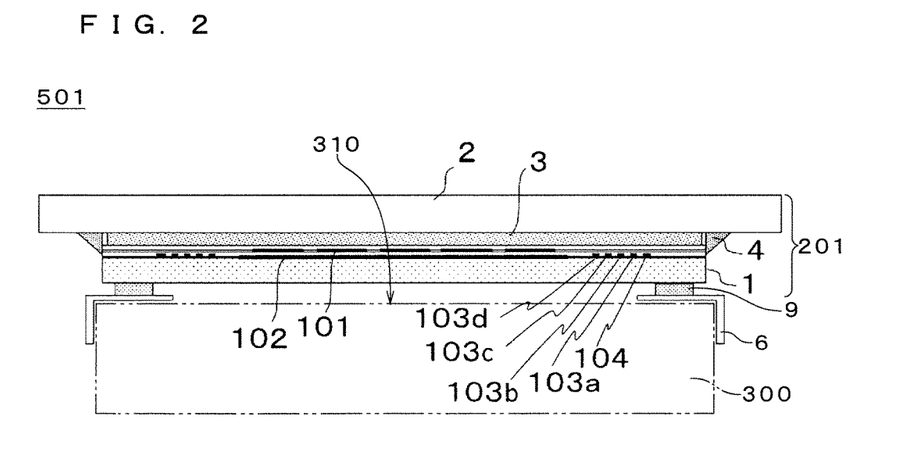
FIG. 2 is a view schematically illustrating a structure of an image display device according to the first preferred embodiment, namely, a cross-sectional view corresponding to a portion taken along the line A-A in FIG. 1.

FIG. 1 is a top view illustrating a structure of a projection-type touch panel device 201 according to this first preferred embodiment. FIG. 2 is a view schematically illustrating a structure of an image display device 501 according to this first preferred embodiment, namely, a cross-sectional view corresponding to a portion indicated by the one dot chain line in the drawing of the touch panel device 201 illustrated in FIG. 1 (portion taken along the line A-A). As in FIG. 1, the projection-type touch panel device 201 includes a touch sensor panel 1, a protective plate 2, a transparent adhesive material 3, a moisture-proof sealing member 4, and a flexible wiring board (flexible printed circuit (FPC)) 5. The touch sensor panel 1 includes a sensor region 11 to be touched by a pointer, and a lead-out wiring region 14 for connecting a plurality of sensors to the FPC 5. The plurality of sensors are connected to an external circuit via the FPC 5. As in FIG. 2, the touch panel device 201 is mounted to an image display module 300. The image display module includes a display region 310 covered by the touch panel device 201. Note that, as illustrated in FIG. 2, a gap may be provided between the touch panel device 201 and the display region 310.

Note that, FIG. 2 is a schematic illustration of the image display device 501, and thus omitting illustrations of a touch panel controller substrate (external circuit), an image display module (liquid crystal display device in this preferred embodiment), a host device, cables, and the like, which are practically necessary but not so in the following description.

The touch sensor panel 1 includes, as sensors for detecting a touch, a plurality of X sensors 101 extending in a vertical direction and being arrayed in a horizontal direction (X-coordinate detecting sensors), and a plurality of Y sensors 102 extending in the horizontal direction and being arrayed in the vertical direction (Y-coordinate detecting sensors). That is, the plurality of X sensors 101 and the plurality of Y sensors 102 are arranged so as to be orthogonal to each other. In FIG. 1, for the sake of simplifying the illustration, five X sensors and four Y sensors are illustrated as configuration of the sensors. In each sensor, self-capacitance parasitic between each sensor and the image display module 300 is present, which is generated due to influence of a common electrode of a liquid crystal display module or the like to which the touch sensor panel 1 is attached. Further, mutual capacitance is present between the X sensors and the Y sensors.

Each sensor of the touch sensor panel 1 is connected to lead-out wiring provided in a peripheral portion of a touch region of the touch sensor panel 1 (lead-out wiring region 14). The lead-out wiring is wired along a periphery of the touch sensor panel 1 to be connected to a terminal portion 105 surrounded by the dashed line in the drawing. Between Y-sensor lead-out wiring 103 and X-sensor lead-out wiring 107, shield wiring 106 for shielding influence of capacitance parasitic between electrodes that are provided between the X sensors and the Y sensors is provided. Further, between the Y-sensor lead-out wiring 103 and a periphery of the touch sensor panel, shield wiring 104 for shielding influence of capacitance parasitic between the Y sensors and other electrodes in vicinity thereof is provided. The terminal portion 105 is connected to a touch panel controller (not shown) via the FPC 5 indicated by the dashed line.

The touch panel controller has a built-in circuit for measuring electrostatic capacitance, and measures self-capacitance or mutual capacitance of each sensor to detect change in electrostatic capacitance caused by a touch of a pointer such as a finger on the protective plate.

Further, the touch panel controller has means of determining, based on the detection results, a position of the pointer with use of a built-in arithmetic circuit, and transmitting the touch information and the like indicating presence or absence and coordinates of the touch of the pointer to a host device (not shown).

The X sensors 101 and the Y sensors 102 in many cases have, on a glass substrate or a film substrate, an electrode made of a transparent conductive film (indium tin oxide (ITO)), or made of metallic ultra-fine wiring of copper or aluminum having a width of several micrometers, so as to have transmittance of 80% or more. An interlayer film is provided between the X sensors 101 and the Y sensors 102. Further, for the purpose of protecting the X sensors 101 and the Y sensors 102, those components are covered by a thin protective film.

The touch sensor panel 1 is attached to the protective plate 2 with the transparent adhesive material 3 so as not to have an air layer therebetween. For the sake of reliability of its robustness, the protective plate 2 is made of glass enhanced in robustness and scratch resistance through chemically reinforcing processing or the like. As a material for the transparent adhesive material 3, a material having relative permittivity of approximately from 3 to 6 and water vapor permeability of approximately from 50 [g/m$^2$·24 hr] to 300 [g/m$^2$·24 hr], such as an acrylic resin, is generally used.

The transparent adhesive material 3 is attached to each of the touch sensor panel 1 and the protective plate 2 under a humidity-controlled environment. In order not to expose, to outside air, surfaces of the transparent adhesive material 3 other than a surface to come in close contact with the touch sensor panel 1 and a surface to come in close contact with the protective plate 2, that is, lateral sides of the transparent adhesive material 3 (surfaces along four sides in FIG. 1, right and left lateral sides in FIG. 2), such lateral sides are hermetically sealed by the moisture-proof sealing member 4.

The above touch panel device 201 is attached to a metallic frame 6 of the image display module 300 with a double sided tape 9. As a modified example, for the purpose of reducing external light reflection and raising transmittance of the image display module, not only the protective plate 2 and the touch sensor panel 1 but the touch panel device 201 and the image display module 300 may also be attached to each other with the transparent adhesive material.

It is desirable that water vapor permeability of the moisture-proof sealing member 4 be sufficiently low compared to water vapor permeability of the transparent adhesive material 3. It is desirable that relative permittivity of the moisture-proof sealing member 4 be smaller than relative permittivity of the transparent adhesive material 3. Specifically, "HumiSeal" manufactured by Chase Corporation ("HumiSeal 1B58LU") having a polyolefin resin as its main component or the like is used. Water vapor permeability of "HumiSeal 1B58LU" is 6.0 [g/m$^2$·24 h], which is extremely small as being from ⅒ to ¹⁄₅₀ of water vapor permeability of a general transparent adhesive material, and also relative permittivity thereof is sufficiently small as being 2.0.

Figure 3:
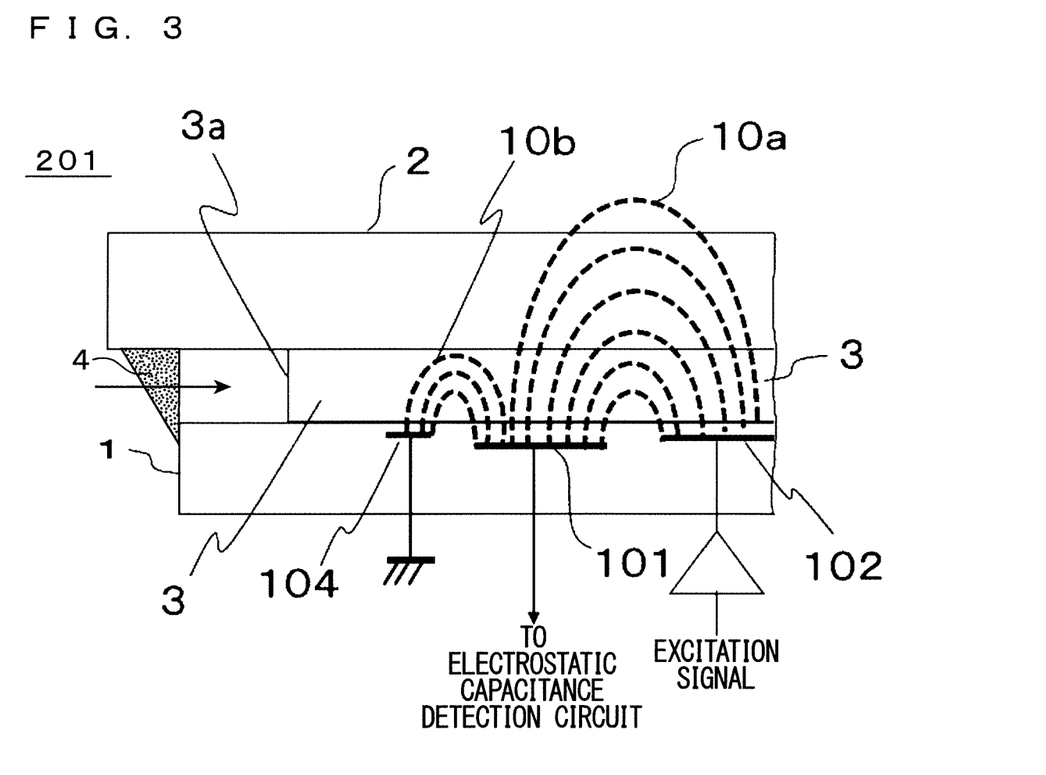
FIG. 3 is an enlarged cross-sectional view of the touch panel device according to the first preferred embodiment.

Next, description is given of influence in a case where relative permittivity of the transparent adhesive material 3 is changed. FIG. 3 is a partial schematic illustration of the cross-sectional view of FIG. 2. In a case where mutual capacitance between the X sensors 101 and the Y sensors 102 is measured, the X sensors 101 is measured by an electrostatic capacitance detection circuit (formed of integrating circuit, amplifier, analog/digital conversion circuit (A/D), and the like) (not shown) while applying an excitation signal (square wave of approximately 100 KHz or the like) to the Y sensors 102. In order to increase touch detecting sensitivity, the X sensors 101 and the Y sensors 102 are arranged so as to have a small area in which the X sensors 101 and the Y sensors 102 are overlapped and to have a large area in which the X sensors 101 and the Y sensors 102 are arrayed on a plane. Therefore, electric force lines 10a and 10b spread between the X sensors 101 and the Y sensors 102 as in the illustration. Thus, the mutual capacitance between those sensors is influenced by a dielectric right above the X sensors 101 and the Y sensors 102.

The transparent adhesive material 3 is provided right above the sensors, and the protective plate 2 is provided above the transparent adhesive material 3. Therefore, the above-mentioned mutual capacitance may be influenced by dielectrics of both of the transparent adhesive material 3 and the protective plate 2. Although depending upon a thickness of these components, change at least in relative permittivity of the transparent adhesive material 3 leads to change in mutual capacitance between the X sensors 101 and the Y sensors 102 because the transparent adhesive material 3 is arranged near the sensors.

The mutual capacitance between the X sensors 101 and the Y sensors 102 illustrated in FIG. 3 is slightly influenced by the shield wiring 104 connected to ground (GND), and such influence is also influenced by the change in relative permittivity of the transparent adhesive material 3.

In an electrostatic capacitive touch panel device, each sensor has some parasitic capacitance even under a state in which a pointer (not shown) is out of touch. Therefore, assuming that a value measured under a state in which a pointer is out of touch as a reference value (baseline) and regarding that a differential value between the reference value and a measured value at each time as change in electrostatic capacitance caused by the touch of the pointer, presence or absence and positional coordinates of the touch are computed.

In the highly sensitive touch panel device 201 capable of being operated even in a state of using thick gloves, it is desirable that change in electrostatic capacitance caused by a factor other than intended operations of a pointer be as small as possible.

In order to stabilize operations of the highly sensitive touch panel device 201, it is desirable that change in relative permittivity of the transparent adhesive material 3 be small. According to this preferred embodiment, the moisture-proof sealing member 4 blocks outside air to enter the transparent adhesive material 3 (refer to the arrow of FIG. 3). With this, the transparent adhesive material 3 is less liable to be influenced by humidity of outside air. Thus, a touch panel detection operation under a high humidity environment is stabilized.

Description has been given of mutual capacitance between the X sensors 101 and the Y sensors 102 with reference to FIG. 3, but similarly the transparent adhesive material 3 right above those wirings may also influence between the Y-sensor lead-out wiring 103 and the shield wiring 104 that are wired along a peripheral portion of the touch sensor panel 1.

Note that, suppose that the moisture-proof sealing member 4 (FIG. 3) is omitted, surfaces of the transparent adhesive material 3 viewed from the arrow (FIG. 3) direction, that is, lateral sides, are exposed to outside air. With this, moisture contained in outside air is absorbed into the transparent adhesive material 3. As a result, a touch panel detection operation under a high humidity environment is destabilized.

<Comparison>

Figure 4A:
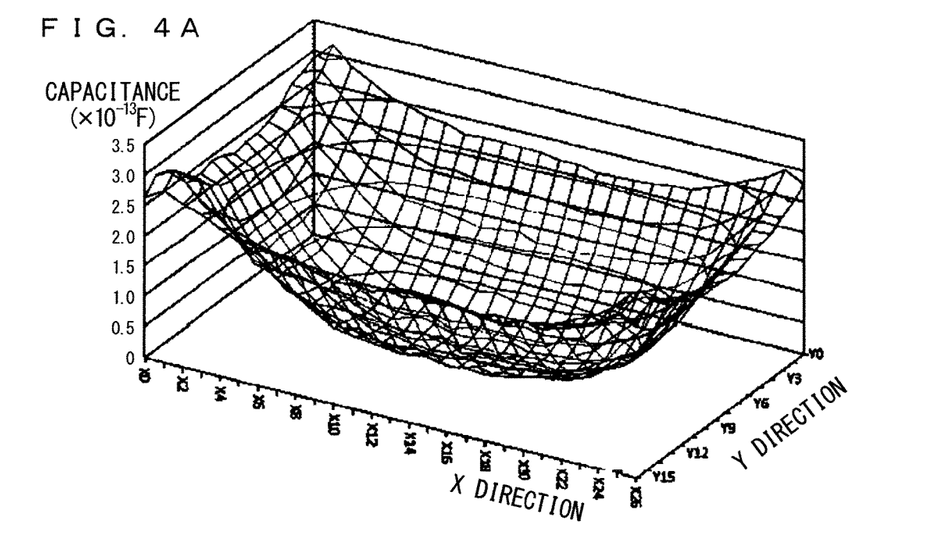
FIG. 4A is a graph showing measurement results of mutual capacitance of a touch panel device according to a comparative example.
Figure 4B:
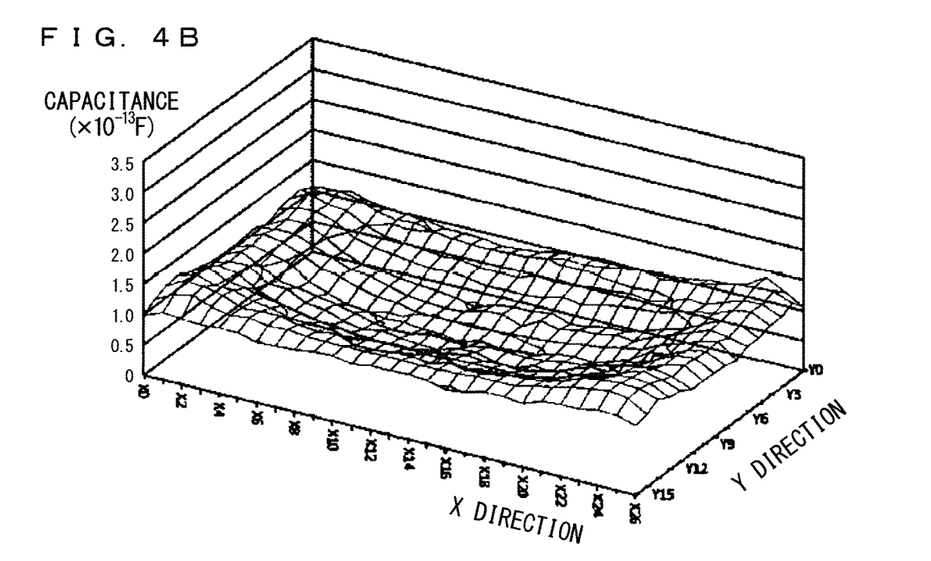
FIG. 4B is a graph showing measurement results of mutual capacitance of a touch panel device according to an example of the first preferred embodiment.

FIG. 4A and FIG. 4B show measurement results of mutual capacitance values of touch panel devices after conducting a high temperature and high humidity test (temperature of 60° C., relative humidity of 90%, and time period of 500 hours). Specifically, FIG. 4A is a graph according to a comparative example omitting the moisture-proof sealing member 4, and FIG. 4B is a graph according to an example of this first preferred embodiment. In the comparative example and the example, the touch sensor panel 1 has configuration in which twenty-seven X sensors (corresponding to X0 to X26 in FIG. 4A and FIG. 4B) and sixteen Y sensors (corresponding to Y0 to Y15 in FIG. 4A and FIG. 4B) cross in a matrix pattern.

As is apparent from FIG. 4A, mutual capacitance values of the touch panel device of the comparative example were significantly non-uniform in a surface thereof, and mutual capacitance was prominently large particularly at four corners. Based on the measurement results, it was found that relative permittivity of the transparent adhesive material 3 after conducting the high temperature and high humidity test was non-uniform in a surface thereof and that relative permittivity was largest at four corners. The non-uniform distribution is considered to be caused by exposure of four sides (top, bottom, right, and left sides in FIG. 1) of the transparent adhesive material 3 to outside air. In that case, it is considered that such measurement results having mutual capacitance values reduced toward the center were obtained because a moisture absorption quantity in the central portion was small while the four corners most absorbed moisture.

On the other hand, as is apparent from FIG. 4B, mutual capacitance values of the touch panel device of the example had comparatively small fluctuation in a surface thereof, and the decline in the central portion was also small as compared to the four corners. This is considered to be resulting from the provision of the moisture-proof sealing member 4, which blocked outside air from entering four sides (top, bottom, right, and left sides in FIG. 1) of the transparent adhesive material 3 to thereby suppress absorption of moisture into the transparent adhesive material 3.

In the comparative example, mutual capacitance in a surface of the sensor region 11 indicated by the dashed line in FIG. 1 is influenced by moisture absorption shown in FIG. 4A. In a case where such influence becomes unignorably large with respect to an electrostatic capacitance detection range (dynamic range) of the touch panel controller, an error is generated in capacitance change due to a touch operation, resulting in increase in errors of coordinates to be calculated. Further, in a case where the influence is further larger, an over-range occurs in a detection circuit, and hence change caused by a touch cannot be captured by the detection circuit, thereby being unable to detect the touch.

Conversely, in a case where the transparent adhesive material 3 sufficiently absorbing moisture is exposed to a dry environment, a moisture absorption quantity is reduced from a peripheral portion, and such distribution as inverted mutual capacitance distribution of FIG. 4A, that is, distribution having high capacitance values in the central portion and low capacitance values in the peripheral portion, may be obtained. In this case, mutual capacitance in a surface of the sensor region 11 is influenced by the drying. This influences a capacitance detection operation of the touch panel device 201. As is apparent from the above-mentioned comparison results, in the touch panel device 201 of this preferred embodiment, outside air is blocked by the moisture-proof sealing member 4 to prevent moisture absorption of the transparent adhesive material 3. With this, change in relative permittivity of the transparent adhesive material 3 under a high temperature and high humidity environment is suppressed. Thus, change in self-capacitance of each sensor (X sensors 101 and Y sensors 102) of the touch sensor panel 1 and change in mutual capacitance between the sensors, which are caused by influence of the transparent adhesive material 3, are reduced. Thus, a touch coordinate detection operation of a touch panel under a high temperature and high humidity environment can be stabilized.

Note that, in the first preferred embodiment, description has been given of the touch sensor panel 1 having the X sensors 101 and the Y sensors 102 that are arranged in a matrix pattern, but similar effects may also be attained in a segment-type touch panel having a plurality of touch electrodes that are arranged in a touch panel surface.

It is most desirable that the moisture-proof sealing member 4 cover entire lateral sides (four sides in FIG. 1) of the transparent adhesive material 3 that are otherwise exposed to outside air. However, even when the moisture-proof sealing member 4 is omitted in a gap between the FPC 5 and the protective plate 2 or the like, in which an area thereof to come in contact with outside air is small, the effects may be attained to some extent.

Further, in a case where influence of parasitic capacitance between the lead-out wiring (Y-sensor lead-out wiring 103 and X-sensor lead-out wiring 107) and the shield wiring (shield wirings 104 and 106) or between the lead-out wiring (Y-sensor lead-out wiring 103 and X-sensor lead-out wiring 107) and the metallic frame 6 is large, only lateral sides of the moisture-proof sealing member 4 that extend along the lead-out wiring (Y-sensor lead-out wiring 103 and X-sensor lead-out wiring 107) having large influence may be sealed. According to such a configuration, cost effectiveness may be increased in some cases.

That is, at least a part of a region of the transparent adhesive material 3 that is out of contact with the protective plate 2 or the touch sensor panel 1 is covered by the moisture-proof sealing member 4, and therefore stabilization of a coordinate detection operation of the touch panel device 201 under a high temperature and high humidity environment may be expected.

In the touch sensor panel 1 of the example of this preferred embodiment, a silicon dioxide film ($SiO_2$) having a film thickness of 1 micrometer is used as the interlayer film between the X sensors 101 and the Y sensors 102 and as a protective insulation film for protecting the X sensors 101 and the Y sensors 102. In a case where the interlayer film and the protective insulation film are thin as described above, influence of change in permittivity of the transparent adhesive material 3 is large. Thus, in this case, the effects attained through suppression of change in relative permittivity of the transparent adhesive material 3 by providing the moisture-proof sealing member 4 are particularly significant. In recent years, the protective insulation film may be in some cases thickened slightly for the purpose of enhancing resistance to damage of the touch sensor panel 1 due to electrostatic discharge; however, comparatively significant effects may be attained as long as a film thickness thereof is 2 micrometers or less. That is, comparatively significant effects may be attained as long as a distance from sensor electrode surfaces (surfaces of X sensors 101 or Y sensors 102) of the touch sensor panel 1 to the transparent adhesive material 3 is 2 micrometers or less.

On the other hand, in a case where the touch sensor panel 1 is formed through attachment of a glass substrate in which the X sensors 101 are formed and a glass substrate in which the Y sensors 102 are formed, that is, a case where the touch sensor panel 1 is formed of two glass substrates, the glass substrates are positioned right above each sensor, and hence influence of change in permittivity of the transparent adhesive material 3 is small slightly, but the above-mentioned effects may still be attained to some extent.

(Second Preferred Embodiment)

Figure 5:
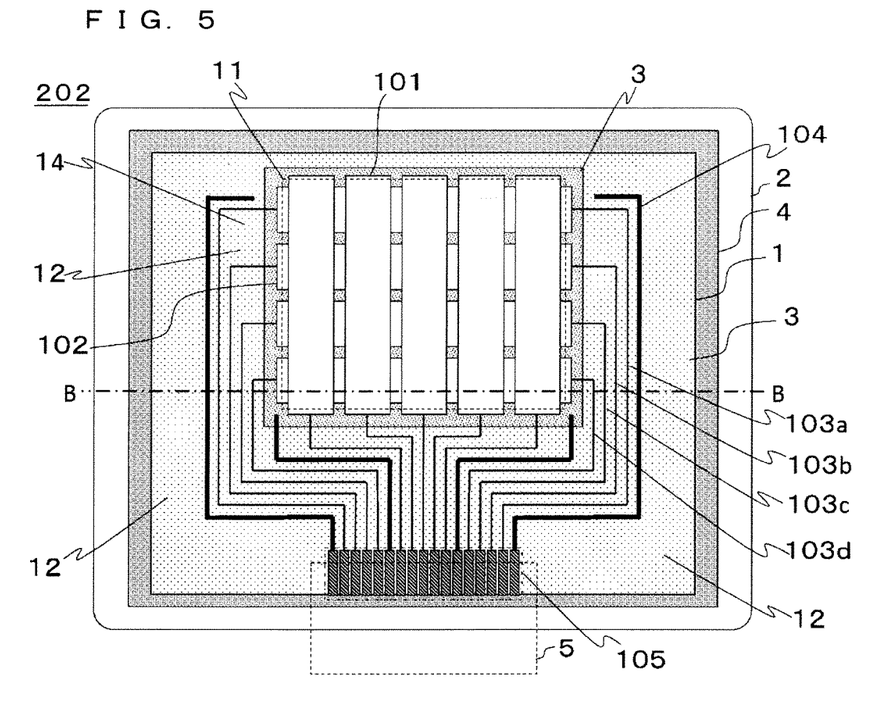
FIG. 5 is a top view schematically illustrating a structure of a touch panel device according to a second preferred embodiment.
Figure 6:
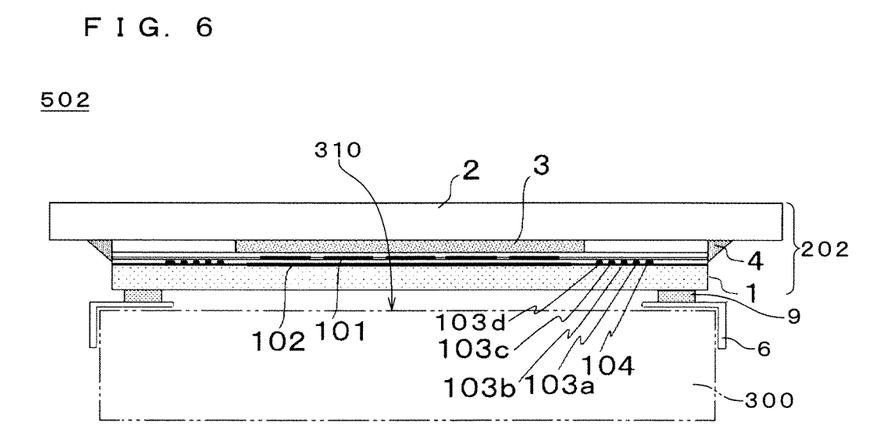
FIG. 6 is a view schematically illustrating a structure of an image display device according to the second preferred embodiment, namely, a cross-sectional view corresponding to a portion taken along the line B-B in FIG. 5.

FIG. 5 is a top view illustrating a structure of a touch panel device 202 according to this second preferred embodiment. FIG. 6 is a view schematically illustrating a structure of an image display device 502 according to this second preferred embodiment, namely, a cross-sectional view corresponding to a portion indicated by the one dot chain line in the drawing of the touch panel device 202 illustrated in FIG. 5 (portion taken along the line B-B). In the touch panel device 202 of this preferred embodiment, unlike the configuration of FIG. 1, a position and a size of the transparent adhesive material 3 are selected so that the sensor region 11 indicated by the dashed line is covered and that the lead-out wiring region 14 is partially uncovered. Thus, in the touch sensor panel 1, a portion right above the sensor region 11 is covered by the transparent adhesive material 3, and a space 12 is provided above a part of the lead-out wiring region 14, which is not covered by the transparent adhesive material 3. Except for this point, configuration of the image display device 502 of this preferred embodiment is similar to the configuration of the image display device 501 of the first preferred embodiment.

Figure 7A:
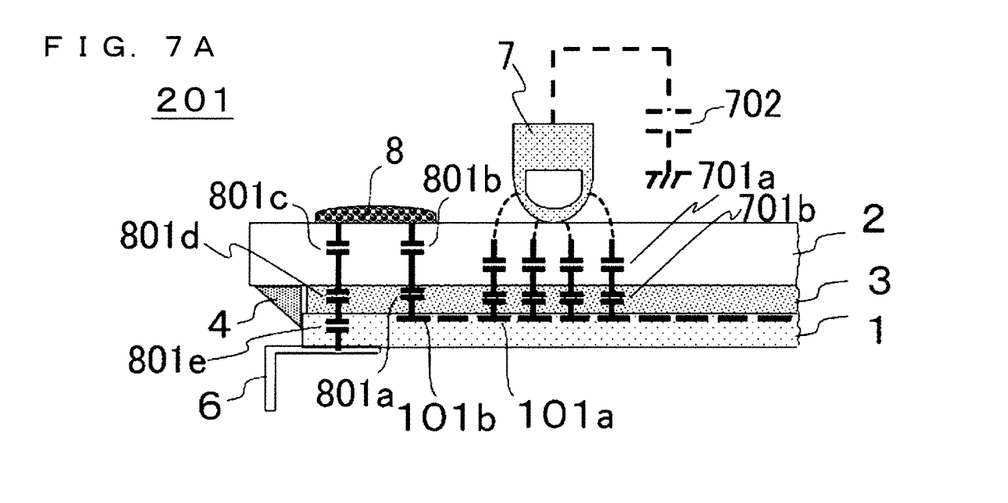
FIG. 7A is an enlarged cross-sectional view of a state in which water adheres to the touch panel device according to the first preferred embodiment.
Figure 7B:
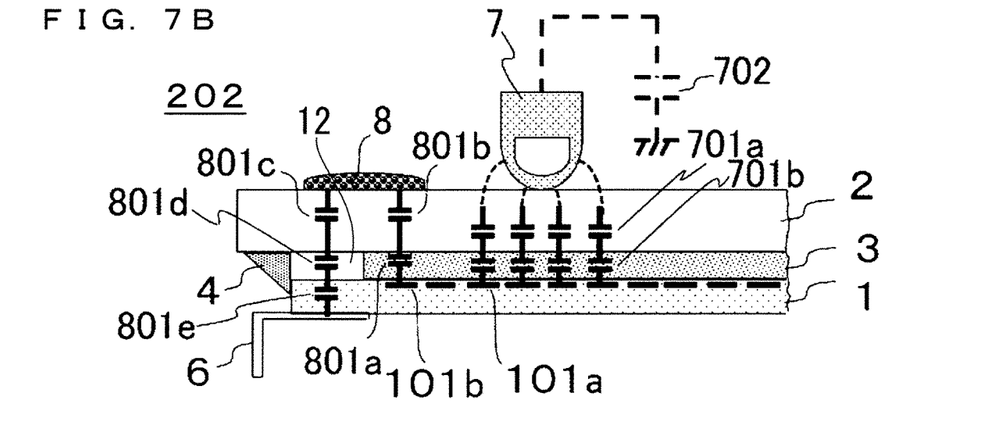
FIG. 7B is an enlarged cross-sectional view of a state in which water adheres to the touch panel device according to the second preferred embodiment.

FIG. 7A and FIG. 7B are enlarged cross-sectional views schematically illustrating states in which water 8 adheres to the touch panel device 201 (FIG. 2) and the touch panel device 202 (FIG. 6), respectively. Further, the drawings also illustrate an equivalent circuit of parasitic capacitance relating to the metallic frame 6 of the image display module 300 (not shown) at the time when a pointer 7 is in touch. Note that, the same is applicable also in a case of adhesion of a high dielectric substance, such as salt water, beverage, and chemicals, in place of the water 8.

In FIG. 7A and FIG. 7B, the pointer 7 (finger) forms capacitance between the pointer 7 and X sensors 101*a* of the touch sensor panel 1. The protective plate 2 and the transparent adhesive material 3 exist between the pointer 7 and the X sensors 101*a* of the touch sensor panel 1, and hence the formed capacitance is capacitance corresponding to series connection of capacitance 701*a* in the protective plate 2 and capacitance 701*b* in the transparent adhesive material 3.

Such capacitance often is smaller than approximately 1 pF, although depending on a width of the X sensor 101*a*, a state of the pointer 7 (such as area in contact with protective plate 2 and presence or absence of gloves), and a thickness and relative permittivity of the protective plate 2 and the transparent adhesive material 3. Particularly at the time of an operation using thick gloves such as cotton work gloves, the value is further reduced to approximately ⅓. The change in capacitance due to difference between the presence and absence of the pointer 7 is used for determination of presence or absence of a touch and computation for a finger position within the touch region.

In FIG. 7A and FIG. 7B, human body capacitance 702 of the pointer 7 is illustrated. The human body capacitance 702 is generally approximately from 40 pF to 100 pF depending on volume of the body, which is sufficiently large as being ten times or more of the capacitance between the pointer 7 and the X sensors 101*a*. Therefore, the pointer 7 may substantially be regarded to be connected to ground (GND).

In FIG. 7A and FIG. 7B, an X sensor 101*b* is a sensor positioned at an outermost periphery among the plurality of X sensors 101. Because of capacitance coupling via the water 8 having high permittivity (approximately 80), self-capacitance of the X sensor 101*b* at the time when the water 8 adheres to a peripheral portion of the protective plate 2 is proportional to electrostatic capacitance corresponding to series connection of capacitances 801*a*, 801*b*, 801*c*, 801*d*, and 801*e* in the drawings. Note that, the capacitance 801*a* is capacitance between the outermost peripheral X sensor 101*b* and the protective plate 2, the capacitances 801*b* and 801*c* are capacitances between the protective plate 2 and the water 8, the capacitance 801*d* is capacitance between the protective plate 2 and the touch sensor panel 1, and the capacitance 801*e* is capacitance between the transparent adhesive material 3 and the metallic frame 6.

In a case where the capacitance formed at the time of adhesion of the water 8 having high permittivity (approximately 80) between the outermost peripheral X sensor 101*b* and the metallic frame 6 exceeds a threshold value for determining presence or absence of a touch of the pointer 7, influence due to the water 8 and a touch of the pointer 7 (finger) may not be distinguished from each other. Therefore, this is a cause of misdetection. The threshold value for determining presence or absence of a touch of the pointer 7 is set to be further smaller in a case of a highly sensitive touch panel that is adaptable to a glove operation, and hence, relatively, influence due to adhesion of the water 8 becomes particularly larger.

In the touch panel device 201 (first preferred embodiment), the touch sensor panel 1 has a region that overlaps the metallic frame 6, and the transparent adhesive material 3 (relative permittivity of approximately from 3 to 6) is provided right above the region. On the other hand, in the touch panel device 202 (second preferred embodiment), the space 12, instead of the transparent adhesive material 3, is provided above the corresponding region. The space 12 is formed of air having relative permittivity of 1, and hence the capacitance 801*d* is smaller in the case of the second preferred embodiment. Therefore, parasitic capacitance between the outermost peripheral X sensor 101*b* and the metallic frame 6, which is generated due to influence of adhesion of the water 8, is reduced owing to the presence of the space 12.

Figure 8:
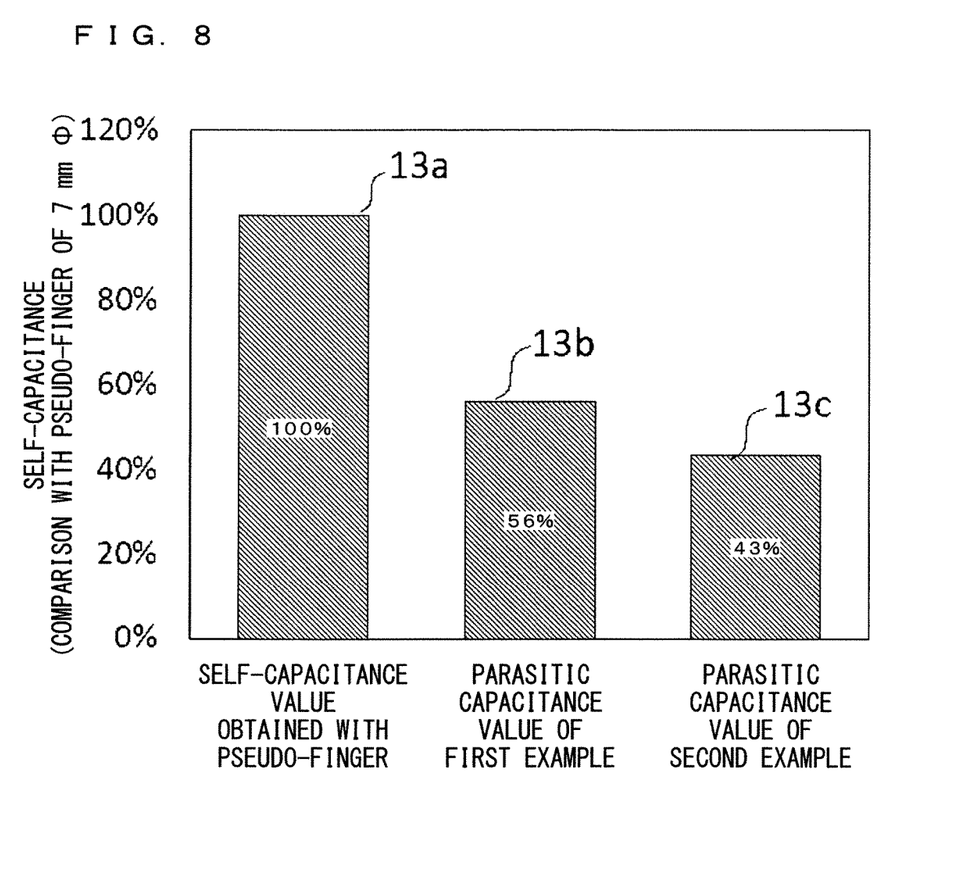
FIG. 8 is a graph showing parasitic capacitance generated due to adhesion of water in touch panel devices of first and second examples corresponding respectively to the first and second preferred embodiments, which is normalized by self-capacitance obtained with a pseudo-finger.

FIG. 8 is a graph showing parasitic capacitance values between the outermost peripheral X sensor 101*b* and the metallic frame 6 of the image display module 300 in a relative ratio on the basis of a self-capacitance value corresponding to sensitivity of a pseudo-finger when the water 8 adheres to a peripheral portion of the protective plate 2 in touch panels of first and second examples corresponding respectively to the first preferred embodiment and the second preferred embodiment (the adhered area being a double of a circle having a diameter of 7 mm). A value 13*a* of FIG. 8 is a self-capacitance value in a case where a pseudo-finger as the pointer 7 (a brass bar to come in contact in a circle having a diameter of 7 mm) is disposed on a touch panel device that includes the protective plate 2 made of glass and having a thickness of 0.7 mm (relative permittivity of 5.8), the touch sensor panel 1 having a thickness of 0.5 mm (relative permittivity of 5.8), and the transparent adhesive material 3 having a thickness of 0.2 mm (relative permittivity of 5.8).

Assuming that the self-capacitance value is 100% for the normalization, parasitic capacitance values between the outermost peripheral X sensor 101*b* and the metallic frame 6 of the image display module 300 were compared between the first example and the second example when the water 8 adhered to a peripheral portion of the protective plate 2 (the adhered area being a double of a circle having a diameter of 7 mm). A parasitic capacitance value of the first example (corresponding to the above-mentioned first preferred embodiment) indicated by a value 13b in FIG. 8 was 56%, and a parasitic capacitance value of the second example (corresponding to this second preferred embodiment) indicated by a value 13c was 43%. This signifies that, as in the second preferred embodiment (FIG. 6) unlike the first preferred embodiment (FIG. 2), omission of the transparent adhesive material 3 right above the touch sensor panel 1 in the region overlapping the metallic frame 6 (FIG. 6) leads to reduction of a parasitic capacitance value by 13%, for example.

The reduction of the parasitic capacitance value has effects of reducing a rate of misdetection at the time of adhesion of the water 8 in a case where a threshold value for determining a touch is lowered so as to gain a highly sensitive touch panel device for the purpose of being adaptable to an operation using thick gloves or the like. Further, although not shown in FIG. 7A and FIG. 7B, parasitic capacitance values between the outermost peripheral X sensor 101b and the shield wiring (shield wirings 104 and 106) (GND potentials in touch sensor panel 1), which are generated due to influence of adhesion of the water 8, are also similarly reduced because the transparent adhesive material 3 is omitted in a peripheral portion in the second preferred embodiment.

According to the above, in the second example, effects of reducing misdetection of touch coordinates when the water 8 adheres to a peripheral portion of the protective plate 2 may be attained in addition to the effect of the first example.

In the above-mentioned first preferred embodiment and second preferred embodiment, "HumiSeal" manufactured by Chase Corporation having a polyolefin resin as its main component (water vapor permeability of 6.0 [g/m$^2$·24 h]) is adopted as the moisture-proof sealing member 4. However, the effects may be attained as long as a portion of the transparent adhesive material 3 that may be exposed to outside air is hermetically sealed by a material having water vapor permeability lower than water vapor permeability of the transparent adhesive material 3. For example, similar effects may also be expected with use of "TUFFY", which is a moisture proof insulating material for an FPC (50 g/m$^2$·24 h (temperature of 40° C./relative humidity of 90%)) manufactured by Hitachi Chemical Co., Ltd. Further, the moisture-proof sealing member 4 is not to be limited to a coating type. Similar effects may also be expected through attachment of a polyimide film tape such as a Kapton tape as the moisture-proof sealing member 4 in a manner of covering four sides of the transparent adhesive material 3 so as not to expose the transparent adhesive material 3 to outside air.

Further, in the above-mentioned first preferred embodiment and second preferred embodiment, the touch panel device and the image display module may be attached with a transparent adhesive material in place of a double sided tape. In this case, four sides (top, bottom, right, and left sides in FIG. 1) of the transparent adhesive material used for the attachment that are out of contact from the image display module 300 or the touch sensor panel 1 are exposed to outside air. In order to prevent moisture absorption into the transparent adhesive material through the four sides that are exposed to outside air, as a matter of course, the four sides may be covered by a moisture-proof sealing member water having low vapor permeability.

Note that, in the present invention, each of the preferred embodiments may be freely combined, and each of the preferred embodiments may be omitted or modified as appropriate within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A touch panel device comprising:
a touch sensor panel having a plurality of sensors;
a protective plate for protecting the touch sensor panel;
a transparent adhesive material for attaching the touch sensor panel and the protective plate;
a moisture-proof sealing member having water vapor permeability that is lower than water vapor permeability of the transparent adhesive material, at least a portion of the moisture-proof seal being even with and surrounding at least a portion of a perimeter of the transparent adhesive material; and
a flexible wiring board for connecting the plurality of sensors to an external circuit,
wherein the transparent adhesive material has a region that is out of contact with the protective plate or the touch sensor panel, and at least a part of the region is covered by the moisture-proof sealing member.

2. The touch panel device according to claim 1, wherein:
the touch sensor panel has a sensor region to be touched by a pointer, and a lead-out wiring region for connecting the plurality of sensors to the flexible wiring board; and
the transparent adhesive material covers the sensor region, and uncovers at least a part of the lead-out wiring region.

3. A touch panel device comprising:
a touch sensor panel having a plurality of sensors;
a protective plate for protecting the touch sensor panel;
a transparent adhesive material for attaching the touch sensor panel and the protective plate;
a moisture-proof sealing member having water vapor permeability that is lower than water vapor permeability of the transparent adhesive material; and
a flexible wiring board for connecting the plurality of sensors to an external circuit,
wherein the transparent adhesive material has a region that is out of contact with the protective plate or the touch sensor panel, and at least a part of the region is covered by the moisture-proof sealing member, and
a distance from a sensor electrode surface of the touch sensor panel to the transparent adhesive material is 2 micrometers or less.

4. An image display device comprising:
the touch panel device of claim 1; and
an image display module having a display region covered by the touch panel device, the image display module being attached to the touch panel device with use of a double sided tape or a transparent adhesive material.

5. The touch panel device according to claim 1, wherein a distance from a sensor electrode surface of the touch sensor panel to the transparent adhesive material is 2 micrometers or less.

* * * * *